US010753432B2

(12) United States Patent
Hwang et al.

(10) Patent No.: US 10,753,432 B2
(45) Date of Patent: Aug. 25, 2020

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Woochurl Son, Seongnam-si (KR); Kijong Park, Hwaseong-si (KR); Sangwon Seo, Seoul (KR); Yong Uk Shin, Suwon-si (KR); Seongwook Ji, Gunpo-si (KR); Ki Tae Kim, Incheon (KR); Chon Ok Kim, Yongin-si (KR); Wonmin Cho, Hwaseong-si (KR); Ma Ru Kang, Yongin-si (KR); Ilhan Yoo, Jeollanam-do (KR); Juhyeon Park, Suwon-si (KR); Minho Chae, Incheon (KR); Dongwoo Kim, Incheon (KR); Hye Jin Lim, Seoul (KR); Ki Been Lim, Yongin-si (KR); Jin Yong Kim, Seoul (KR); Soonki Eo, Ansan-si (KR); Ki Dong Kim, Anyang-si (KR); Woo Jin Chang, Suwon-si (KR); Yong Sug Choi, Hwaseong-si (KR); Sun Sung Kwon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 68 days.

(21) Appl. No.: 16/207,885

(22) Filed: Dec. 3, 2018

(65) Prior Publication Data

US 2019/0383364 A1 Dec. 19, 2019

(30) Foreign Application Priority Data

Jun. 14, 2018 (KR) .......................... 10-2018-0068337

(51) Int. Cl.
*F16H 3/72* (2006.01)
*F16H 3/78* (2006.01)
(Continued)

(52) U.S. Cl.
CPC ............. *F16H 3/725* (2013.01); *F16H 3/006* (2013.01); *F16H 3/78* (2013.01); *F16H 37/0833* (2013.01);
(Continued)

(58) Field of Classification Search
None
See application file for complete search history.

(56) References Cited

U.S. PATENT DOCUMENTS 5,823,051 A * 10/1998 Hall, III ................. F16H 3/006
74/325
6,394,928 B1 * 5/2002 Park ......................... F16H 3/66
475/271
(Continued)

FOREIGN PATENT DOCUMENTS

EP 3121483 A1 1/2017

*Primary Examiner* — David R Morris
*Assistant Examiner* — James J Taylor, II
(74) *Attorney, Agent, or Firm* — Brinks Gilson & Lione (57) ABSTRACT

A power transmission apparatus includes: a first input shaft always receiving an input torque from an engine; second and third input shafts coaxially disposed and selectively connected with the first input shaft; a torque mediating shaft selectively connected with the first input shaft or a transmission housing; first and second intermediate shafts and an output shaft respectively disposed in parallel with the first input shaft; a first preliminary shifting section receiving a torque through a first input gear set, selectively shifting the received torque, and outputting the shifted torque; a second preliminary shifting section including a second shifting gear set which outputs a torque from the first input shaft and
(Continued)

stops; and a compound shifting section forming an output torque by the input torque and the first and second shifted torques.

15 Claims, 7 Drawing Sheets (51) Int. Cl.
*F16H 3/00* (2006.01)
*F16H 37/08* (2006.01)
*B60K 6/48* (2007.10)
*B60K 6/365* (2007.10)
*B60K 6/547* (2007.10)

(52) U.S. Cl.
CPC .............. *B60K 6/365* (2013.01); *B60K 6/547* (2013.01); *B60K 2006/4825* (2013.01); *B60K 2006/4833* (2013.01); *F16H 2200/0021* (2013.01); *F16H 2200/0052* (2013.01); *F16H 2200/2005* (2013.01); *F16H 2200/2048* (2013.01)

(56) References Cited

U.S. PATENT DOCUMENTS

| 8,323,142 | B2 | 12/2012 | Masumoto |
| 9,920,824 | B1* | 3/2018 | Hwang ................ F16H 37/042 |
| 2013/0031990 | A1 | 2/2013 | Singh et al. |
| 2018/0209526 | A1* | 7/2018 | Lian ..................... B60K 17/354 |
| 2019/0308497 | A1* | 10/2019 | Lian ........................ F16H 3/006 |

* cited by examiner

| Shift-stage | CL1 | CL2 | CL3 | CL4 | BK | SN1 | | SN2 | |
|---|---|---|---|---|---|---|---|---|---|
| | | | | | | TDG1 | N | TDG2 | N |
| FD1 | ● | | | ● | | ● | | ○ | ● |
| FD2 | | ● | | ● | | ○ | ● | ● | |
| FD3 | | | ● | ● | | ○ | ● | ○ | ● |
| FD4 | | ● | ● | | | ○ | ● | ● | |
| FD5 | ● | | ● | | | ● | | ○ | ● |
| FD6 | | | ● | | ● | ○ | ● | ● | |

○ : Preliminary engagement available

| | Shift-stage | ECL | CL1 | CL2 | CL3 | CL4 | BK | SN1 | | SN2 | |
|---|---|---|---|---|---|---|---|---|---|---|---|
| | | | | | | | | TDG1 | N | TDG2 | N |
| Engine and Parallel mode | FD1 | ● | ● | | | ● | | ● | | ○ | ● |
| | FD2 | ● | | ● | | ● | | ○ | ● | ● | |
| | FD3 | ● | | | ● | ● | | ○ | ● | ○ | ● |
| | FD4 | ● | | ● | ● | | | ○ | ● | ● | |
| | FD5 | ● | ● | | ● | | | ● | | ○ | ● |
| | FD6 | ● | | | ● | | ● | ○ | ● | ● | |
| EV mode | FD1 | | ● | | | ● | | ● | | ○ | ● |
| | FD2 | | | ● | | ● | | ○ | ● | ● | |
| | FD3 | | | | ● | ● | | ○ | ● | ○ | ● |
| | FD4 | | | ● | ● | | | ○ | ● | ● | |
| | FD5 | | ● | | ● | | | ● | | ○ | ● |
| | FD6 | | | | ● | | ● | ○ | ● | ● | |

○ : Preliminary engagement available

| Shift-stage | CL1 | CL2 | CL3 | CL4 | BK | SN1 | | SN2 | |
|---|---|---|---|---|---|---|---|---|---|
| | | | | | | TDG1 | N | TDG2 | N |
| FD1 | ● | | | ● | | ● | | ○ | ● |
| FD2 | | ● | | ● | | ○ | ● | ● | |
| FD3 | | | ● | ● | | ○ | ● | ○ | ● |
| FD4 | | ● | ● | | | ○ | ● | ● | |
| FD5 | ● | | ● | | | ● | | ○ | ● |
| FD6 | | | ● | | ● | ○ | ● | ○ | ● |

○ : Preliminary engagement available

US 10,753,432 B2

POWER TRANSMISSION APPARATUS FOR VEHICLE

CROSS-REFERENCE TO RELATED APPLICATION

This application claims priority to and the benefit of Korean Patent Application No. 10-2018-0068337, filed on Jun. 14, 2018, the entire contents of which are incorporated herein by reference.

FIELD

The present disclosure relates to a power transmission apparatus for a vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The DCT includes two clutches and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving multiple forward speed stages beyond a fifth forward speed stage. The DCT is used as an automated manual transmission by controlling two clutches and synchronizing devices by a controller, which does not require a driver's manual manipulation.

Compared with an automatic transmission with planetary gear sets, the DCT has excellent power delivery efficiency, simplifies change and addition of components for achieving multiple gear stages, and improves fuel economy.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a power transmission apparatus for a vehicle having advantages of realizing multiple speed stages by adding one planetary gear set and two synchronizers in a dual clutch transmission structure, simplifying its internal structure by reducing the number of components, improving fuel economy by reducing the weight, and improve the mountability by reducing the volume.

Also, an exemplary form of the present disclosure provides a power transmission apparatus enabling the vehicle to run in an electric vehicle mode and a parallel hybrid mode by adding one motor/generator.

A power transmission apparatus for a vehicle according to various exemplary form of the present disclosure may include: a first input shaft connected with an output shaft of an engine, a second input shaft formed as a hollow shaft, coaxially and exteriorly disposed with the first input shaft without rotational interference, and selectively connected with the output shaft of the engine, a third input shaft formed as a hollow shaft, coaxially and exteriorly disposed with the second input shaft without rotational interference, and selectively connected with the output shaft of the engine, a torque mediating shaft formed as a hollow shaft and coaxially and exteriorly disposed with the first input shaft without rotational interference and selectively connected with the first input shaft or a transmission housing, first and second intermediate shafts and an output shaft respectively disposed in parallel with the first input shaft, a first preliminary shifting section receiving a torque through a first input gear set externally gear-meshed with the third input shaft, selectively shifting the received torque by a gear ratio of a first shifting gear set, and outputting the shifted torque, a second preliminary shifting section including a second shifting gear set which outputs a torque from the first input shaft and stops, and a compound shifting section including a planetary gear set having three rotation elements including a sun gear fixedly connected with the output shaft, forming an output torque based on a torque received from the second input shaft through a second input gear set and torques received from the first and second preliminary shifting sections, and outputting the output torque through the output shaft.

The first input gear set may include comprises a first input drive gear and a first input driven gear, the first input drive gear being fixedly connected with the third input shaft, the first input driven gear being fixedly connected the first intermediate shaft and externally gear-meshed with the first input drive gear and the first shifting gear set may include a first shifting drive gear and a first shifting driven gear, the first shifting drive gear disposed coaxial with and exterior to the first intermediate shaft without rotational interference, the first shifting driven gear fixedly connected to the second intermediate shaft and externally gear-meshed with the first shifting drive gear.

The first shifting drive gear may be selectively connected with the first intermediate shaft by a first synchronizer.

A gear ratio of the first shifting gear set may be used for the forward first speed and the forward fifth speed.

The second preliminary shifting section may include a second shifting drive gear coaxially and exteriorly disposed with the first input shaft.

The second shifting drive gear is selectively connected with the torque mediating shaft by a second synchronizer.

The planetary gear set of the compound shifting section may include a ring gear, a planet carrier, and the sun gear, the ring gear may receive torques from the first and second preliminary shifting sections through the second shifting gear set, the planet carrier may receive a torque from the output shaft of the engine through the second input gear set, and the sun gear may selectively connected with the ring gear and fixedly connected with the output shaft so as to act as an output element.

The second input gear set may include a second input drive gear and a second input driven gear, the second input drive gear fixedly connected with the second input shaft, the second input driven gear fixedly connected with the planet carrier and externally gear-meshed with the second input drive gear, and the second shifting gear set may include a second shifting drive gear, an intermediate gear, and a second shifting driven gear, the intermediate gear being fixedly mounted on the second intermediate shaft, the second shifting driven gear being fixedly formed on the ring gear and externally gear-meshed with the second shifting drive gear and the intermediate gear respectively.

A gear ratio of the second shifting drive gear and the second shifting driven gear may be used for the forward second speed and the forward fourth speed.

The power transmission apparatus may further include four clutches each selectively connecting a corresponding pair of rotating members, and a brake selectively connecting a rotating member to the transmission housing.

The four clutches may include a first clutch arranged between the output shaft of the engine and the third input shaft, a second clutch arranged between the first input shaft and the torque mediating shaft, a third clutch arranged between the output shaft of the engine and the second input shaft, and a fourth clutch arranged between the ring gear and the sun gear of the planetary gear set, and the brake may be disposed between the torque mediating shaft and the transmission housing.

The brake may be disposed between the second intermediate shaft and the transmission housing.

The power transmission apparatus may further include a motor/generator coaxially coupled with the first input shaft, selectively connected with the output shaft of the engine through an engine clutch, and selectively connected with the second and third input shafts through respective clutches.

The power transmission apparatus may further include a motor/generator disposed in parallel with the first input shaft, a motor drive gear receiving a torque from the motor/generator, a motor driven gear coaxially formed with the first input shaft, and an idle gear externally gear-meshed with the motor drive gear and the motor driven gear respectively, wherein the torque from the motor/generator is fixedly delivered to the first input shaft through the motor drive gear, the idle gear, and the motor driven gear.

The motor driven gear may be fixedly coupled with the first input shaft, selectively connected with the output shaft of the engine through an engine clutch, and selectively connected with the second and third input shafts through respective clutches.

A power transmission apparatus for a vehicle according to a first exemplary form enables shift-stages of six forward speeds by applying one planetary gear set and two synchronizers to a dual clutch transmission, and accordingly multi-stages may be enabled with simpler structure and reduced weight, thereby improving installability and fuel consumption.

A power transmission apparatus for a vehicle according to second and third exemplary forms further employs one motor/generator to the first exemplary form, and enables driving in an engine driving mode, a parallel hybrid mode, and an electric vehicle mode, thereby further improving fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

Figure 1:
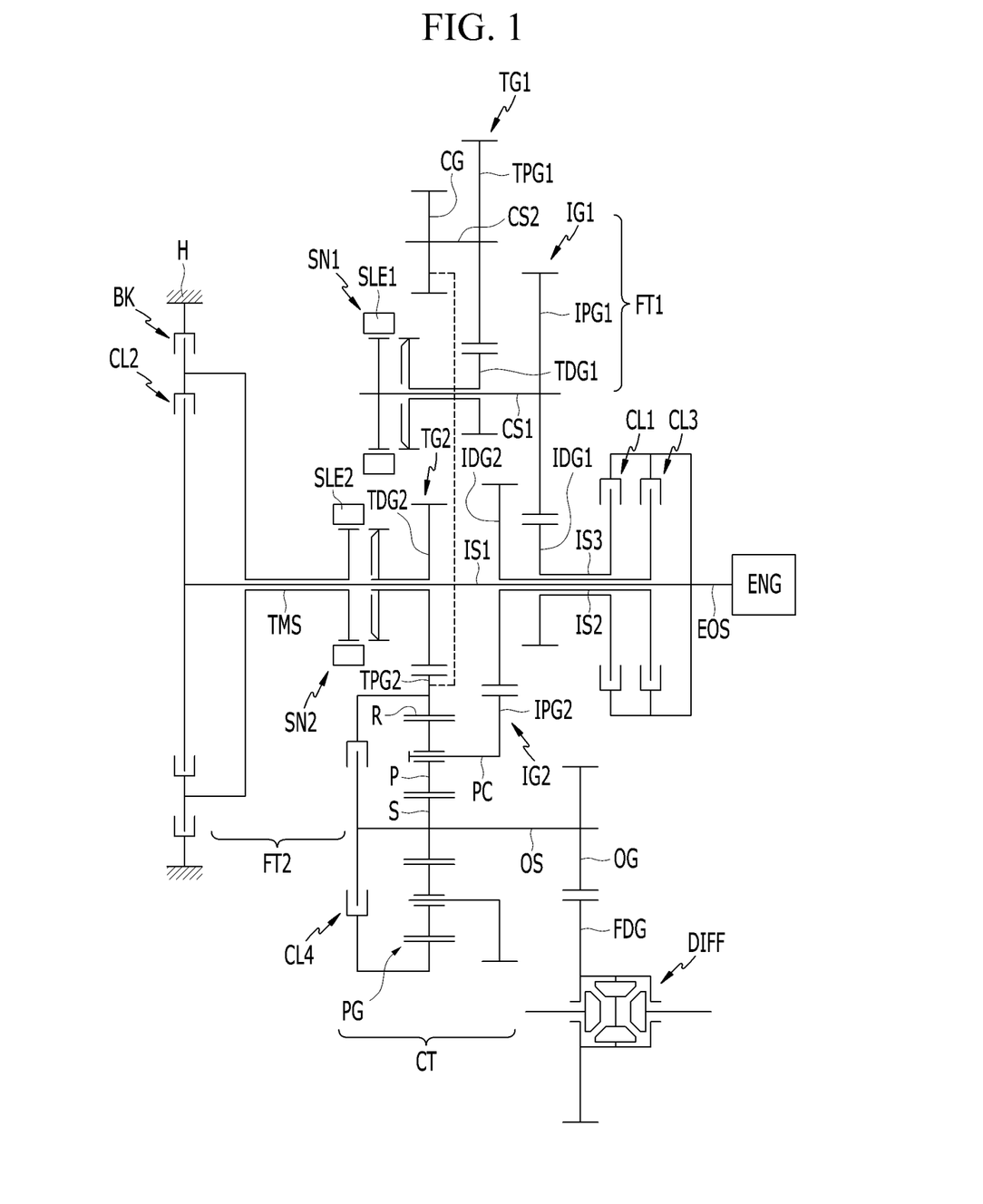
FIG. 1 is a schematic view of a power transmission apparatus for a vehicle according to a first exemplary form of the present disclosure.

FIG. 1 is a schematic view of a power transmission apparatus for a vehicle according to a first exemplary form of the present disclosure.

Referring to FIG. 1, a power transmission apparatus includes: first, second, and third input shafts IS1, IS2, and IS3, first and second intermediate shafts CS1 and CS2, a first torque mediating shaft TMS, first and second preliminary shifting sections FT1 and FT2, a compound shifting section CT, and an output shaft OS.

The engine ENG as a power source may be realized as a various kind of typical engines such as a gasoline engine or a diesel engine that uses fossil fuel.

A power transmission apparatus according to a first exemplary form realizes shift-stages of six forward speeds. A torque of the engine ENG is shifted into a plurality of fixed shift-stages in the first and second preliminary shifting sections FT1 and FT2. The compound shifting section CT selectively receives a torque from the first and second preliminary shifting sections FT1 and FT2 and also selectively receives a torque from the engine ENG, and the compound shifting section CT shifts the received torques and outputs an output torque through the output shaft OS.

The first, second, and third input shafts IS1, IS2, and IS3 and the torque mediating shaft TMS are coaxially disposed. The first and second intermediate shafts CS1 and CS2 and the output shaft OS are disposed in parallel with the input shafts IS1, IS2, and IS3 and the torque mediating shaft TMS. The torque of the engine ENG is transmitted to the first and second preliminary shifting sections FT1 and FT2 and a compound shifting section CT. Synchronizers SN1 and SN2 are included in the first and second preliminary shifting sections FT1 and FT2 respectively and a planetary gear set PG is included in the compound shifting section CT.

The first input shaft IS1 is fixedly connected with an output shaft EOS (crankshaft) of the engine ENG. The first input shaft IS1 selectively transmits a torque of the engine ENG to the planetary gear set PG.

The second input shaft IS2, being formed as a hollow shaft, is disposed coaxial with and exterior to the first input shaft IS1 without rotational interference, and selectively connected with the output shaft EOS of the engine ENG. The second input shaft IS2 selectively transmits the torque of the engine ENG to the compound shifting section CT.

The third input shaft IS3, being formed as a hollow shaft, is disposed coaxial with and exterior to the second input shaft IS2 without rotational interference, and selectively connected with the output shaft EOS of the engine ENG. The third input shaft IS3 selectively transmits the torque of the engine ENG to the first intermediate shaft CS1 of the preliminary shifting section FT.

The torque mediating shaft TMS is formed as a hollow shaft and is disposed coaxial with and exterior to the first input shaft IS1.

The first preliminary shifting section FT1 includes the first and second intermediate shafts CS1 and CS2 and the first synchronizer SN1.

The first intermediate shaft CS1 is externally gear-meshed with the third input shaft IS3 through a first input gear set IG1. The second intermediate shaft CS2 is connectable with the third input shaft IS3 by an externally gear-engagement, through the shifting gear set TG1.

The first input gear set IG1 includes a first input drive gear IDG1 and a first input driven gear IPG1. The first input drive gear IDG1 is fixedly connected with the third input shaft IS3. The first input driven gear IPG1 is fixedly connected with the first intermediate shaft CS1, and externally gear-meshed with the first input drive gear IDG1.

The first shifting gear set TG1 includes a first shifting drive gear TDG1 and a first driven gear TPG1. The first shifting drive gear TDG1 is disposed coaxial with and exterior to the first intermediate shaft CS1 without rotational interference. The first driven gear TPG1 is fixedly connected with the second intermediate shaft CS2, and externally gear-meshed with the first shifting drive gear TDG1.

The first synchronizer SN1 is configured for selectively synchronously connecting the first shifting drive gear TDG1 with the first intermediate shaft CS1.

The second preliminary shifting section FT2 includes the second synchronizer SN2 and the second synchronizer SN2 is configured for selectively synchronously connecting the torque mediating shaft TMS with a second shifting drive gear TDG2 disposed coaxial with and exterior to the first input shaft IS1.

The compound shifting section CT includes the planetary gear set PG and the output shaft OS.

The planetary gear set PG is a single pinion planetary gear set, and includes a sun gear S, a planet carrier PC1 rotatably supporting a plurality of pinion gears P externally gear-meshed with the sun gear S, and a ring gear R internally gear-meshed with the plurality of pinion gears P.

The sun gear S is selectively connected with the ring gear R and fixedly connected with the output shaft OS acting as an output element. The planet carrier PC is fixedly connected with a second input driven gear IPG2 and selectively receiving the torque of the engine ENG. The ring gear R is fixedly connected with a second shifting driven gear TPG2 and selectively receiving a torque through the second synchronizer SN2.

The planet carrier PC and the second input shaft IS2 are externally gear-meshed by a second input gear set IG2 and the ring gear R is externally gear-meshed with the second shifting gear set TG2.

The second input gear set IG2 includes a second input drive gear IDG2 and the second input driven gear IPG2. The second input drive gear IDG2 is fixedly connected the second input shaft IS2. The second input driven gear IPG2 is fixedly connected with the planet carrier PC, and externally gear-meshed with the second input drive gear IDG2.

The second shifting gear set TG2 includes the second shifting drive gear TDG2, a center gear CG and a second shifting driven gear TPG2. The second shifting drive gear TDG2 is disposed coaxial with and exterior to the first intermediate shaft CS1 without rotational interference. The center gear CG is fixedly connected with the second intermediate shaft CS2. The second shifting driven gear TPG2 is externally gear-meshed with the second shifting drive gear TDG2 and the center gear CG Gear ratios in the first and second input gear sets IG1 and IG2, and gear ratios of drive and driven gears in the first and second shifting gear sets TG1 and TG2 may be appropriately set in consideration of transmission requirements.

According to a first exemplary form, in addition to gear ratios of the first and second input gear sets IG1 and IG2, the first shifting gear set TG1 is involved in forming a forward first speed FD1 and a forward fifth speed FD5, and the second shifting gear set TG2 is involved in forming a forward second speed FD2 and a forward fourth speed FD4.

The output shaft OS is an output member, and delivers the shifted driving torque received from the planetary gear set PG to a differential DIFF through an output gear OG and a final reduction gear FDG.

In addition, four engagement elements of first, second, third, and fourth clutches CL1, CL2, CL3, and CL4 are disposed between rotating members such as various shafts and rotation elements of the first planetary gear set PG, and one engagement of a brake BK is disposed a rotating member and the transmission housing H.

The five engagement elements of the four clutches CL1 to CL4 and the brake BK are arranged as follows.

The first clutch CL1 is disposed between the engine output shaft EOS and the third input shaft IS3 so as to selectively connect the engine output shaft EOS and third input shaft IS3.

The second clutch CL2 is disposed between the first input shaft IS1 and the torque mediating shaft TMS so as to selectively connect the first input shaft IS1 and the torque mediating shaft TMS.

The third clutch CL3 is disposed between the engine output shaft EOS and the second input shaft IS2 so as to selectively connect the engine output shaft EOS and second input shaft IS2.

The fourth clutch CL4 is disposed between the ring gear R and the sun gear S (output shaft OS) so as to selectively connect the ring gear R and the sun gear S.

The fourth clutch CL4 enables the planetary gear set PG to integrally rotate.

The brake BK is disposed between the torque mediating shaft TMS and the transmission housing H, thereby the torque mediating shaft TMS to selectively act as a fixed element.

The engagement elements of the first, second, third, and fourth clutches CL1, CL2, CL3, and CL4 and the brake BK may be realized as multi-plate hydraulic pressure friction devices that are frictionally engaged by hydraulic pressure, however, it should not be understood to be limited thereto, since various other configuration that are electrically controllable may be available.

The first and second synchronizers SN1 and SN2 may be formed as a known scheme, and the first and second sleeves SLE1 and SLE2 applied to the first and second synchronizers SN1 and SN2 may be operated by respective actuators (not shown) that may be controlled by a transmission control unit.

Figure 2:
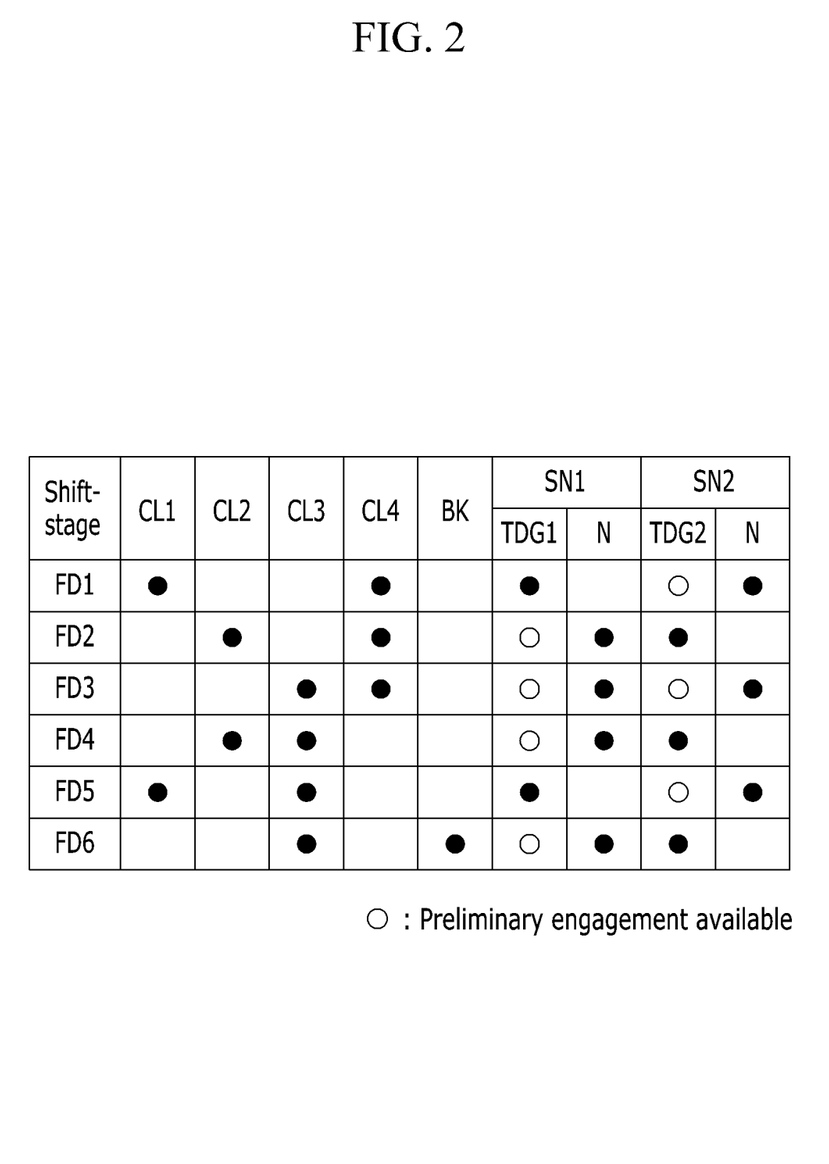
FIG. 2 is a shifting operational chart for a power transmission apparatus for a vehicle according to a first exemplary form of the present disclosure.

FIG. 2 is a shifting operational chart for a power transmission apparatus for a vehicle according to a first exemplary form of the present disclosure, and the power transmission apparatus for a vehicle according to a first exemplary form performs shifting operation as follows.

[the forward first speed]

In the forward first speed FD1, as shown in FIG. 2, the first shifting drive gear TDG1 and the first intermediate shaft CS1 are synchronously interconnected by the sleeve SLE1 of the first synchronizer SN1, and the first clutch CL1 and the fourth clutch CL4 are operated.

Then, by the operation of the first clutch CL1, the torque of the engine ENG is input to the second ring gear R2 of the second planetary gear set PG2 through the third input shaft IS3, the first input drive gear IDG1, the first input driven gear IPG1, the first intermediate shaft CS1, the first shifting drive gear TDG1, the first shifting driven gear TPG1, the second intermediate shaft CS2, the center gear CG, and the second shifting driven gear TPG2.

In addition, the planetary gear set PG integrally rotates by the operation of the fourth clutch C4, and outputs the torque as inputted to the ring gear R, thereby realizing the forward first speed FD1 and outputting a shifted torque to the differential DIFF through the output shaft OS.

That is, the forward first speed is realized by the gear ratios of first input drive gear IDG1, the first input driven gear IPG1, the first shifting drive gear TDG1, the first shifting driven gear TPG1, the intermediate gear CG, and the second shifting driven gear TPG2.

[the forward second speed]

In the forward second speed FD2, as shown in FIG. 2, the second shifting drive gear TDG2 and the torque mediating shaft TMS are synchronously connected by the sleeve SLE2 of the second synchronizer SN2, and the second clutch CL2 and the fourth clutch CL4 are operated.

Then, the torque of the engine ENG is input to the first input shaft IS1 and the torque mediating shaft TMS through the second clutch CL2. In such a state, the torque mediating shaft TMS and the second shifting drive gear TDG2 are interconnected by the operation of the second synchronizer SN2, and the input torque is transmitted to the ring gear R of the planetary gear set PG through the second shifting driven gear TPG2.

In addition, the planetary gear set PG integrally rotates by the operation of the fourth clutch C4, and outputs the torque as inputted to the ring gear R, thereby realizing the forward second speed FD2 and outputting a shifted torque to the differential DIFF through the output shaft OS.

That is, the forward second speed is realized by the gear ratios of the second shifting drive gear TDG2 and the second shifting driven gear TPG2.

[the forward third speed]

In the forward third speed FD3, as shown in FIG. 2, the first and second synchronizers SN1 and SN2 are in a neutral state, and the third clutch CL3 and the fourth clutch CL4 are operated.

Then, by the operation of the third clutch CL3, the torque of the engine ENG is input to the planet carrier PC of the planetary gear set PG through the second input shaft IS2, the second input drive gear IDG2, and the second input driven gear IPG2.

In addition, the planetary gear set PG integrally rotates by the operation of the fourth clutch C4, and outputs the torque as inputted to the ring gear R, thereby realizing the forward third speed FD3 and outputting a shifted torque to the differential DIFF through the output shaft OS.

That is, the forward third speed is realized by the gear ratios of the second input drive gear IDG2 and the second input driven gear IPG2.

[the forward fourth speed]

In the forward fourth speed FD4, as shown in FIG. 2, the second shifting drive gear TDG2 and the torque mediating shaft TMS are synchronously interconnected by the sleeve SEL2 of the second synchronizer SL2, and the second clutch CL2 and the third clutch CL3 are operated.

Then, the torque of the engine ENG is partially input to the ring gear R of the planetary gear set PG through the first input shaft IS1, the torque mediating shaft TMS by the operation of the second clutch CL2, the second shifting drive gear TDG2 by the operation of the second synchronizer SN2.

In addition, by the operation of the third clutch CL3, the torque of the engine ENG is partially input to the planet carrier PC of the planetary gear set PG through the second input shaft IS2, the second input drive gear IDG2, and the second input driven gear IPG2.

Then, the planetary gear set PG receives different torques through the ring gear R and the planet carrier PC. In this state, in comparison to the rotation speed input to the planet carrier PC, the rotation speed input to the ring gear R is smaller and thus the planetary gear set PG outputs an increased rotation speed, thereby realizing the forward fourth speed FD4 and outputting a shifted torque to the differential DIFF through the sun gear S and the output shaft OS.

[the forward fifth speed]

In the forward fifth speed FD5, as shown in FIG. 2, the first shifting drive gear TDG1 and the first intermediate shaft CS1 are synchronously interconnected by the sleeve SLE1 of the first synchronizer SN1, and the first clutch CL1 and the third clutch CL3 are operated.

Then, by the operation of the first clutch CL1, the torque of the engine ENG is partially input to the second ring gear R2 of the second planetary gear set PG2 through the third input shaft IS3, the first input drive gear IDG1, the first input driven gear IPG1, the first intermediate shaft CS1, the first shifting drive gear TDG1, the first shifting driven gear TPG1, the second intermediate shaft CS2, the center gear CG, and the second shifting driven gear TPG2.

In addition, by the operation of the third clutch CL3, the torque of the engine ENG is partially input to the planet carrier PC of the planetary gear set PG through the second input shaft IS2, the second input drive gear IDG2, and the second input driven gear IPG2.

Then, the planetary gear set PG receives different torques through the ring gear R and the planet carrier PC. In this state, in comparison to the rotation speed input to the planet carrier PC, the rotation speed input to the ring gear R is further smaller in the forward fourth speed, and thus the planetary gear set PG outputs an increased rotation speed, thereby realizing the forward fifth speed FD5 and outputting a shifted torque to the differential DIFF through the sun gear S and the output shaft OS.

[the forward sixth speed]

In the forward sixth speed FD6, as shown in FIG. 2, the second shifting drive gear TDG2 and the torque mediating shaft TMS are synchronously interconnected by the sleeve SEL2 of the second synchronizer SL2, and the, third clutch CL3 and the brake BK are operated.

Then, the torque mediating shaft TMS is stationary by the operation of brake BK.

Since the second shifting drive gear TDG2 connected with the torque mediating shaft TMS through the sleeve SEL2 is stationary, the second shifting driven gear TPG2 fixedly connected with the ring gear R is also stationary so as that the ring gear R acts as a fixed element.

While the ring gear R acts as a fixed element, the torque of the engine ENG is input to the planet carrier PC of the planetary gear set PG by the operation of the third clutch CL3.

Then, in comparison to the rotation speed input to the planet carrier PC, the ring gear R is stationary and thus the planetary gear set PG outputs a further increased speed than in the forward fifth speed, thereby realizing the forward sixth speed FD6 and outputting a shifted torque to the differential DIFF through the sun gear S and the output shaft OS.

Figure 3:
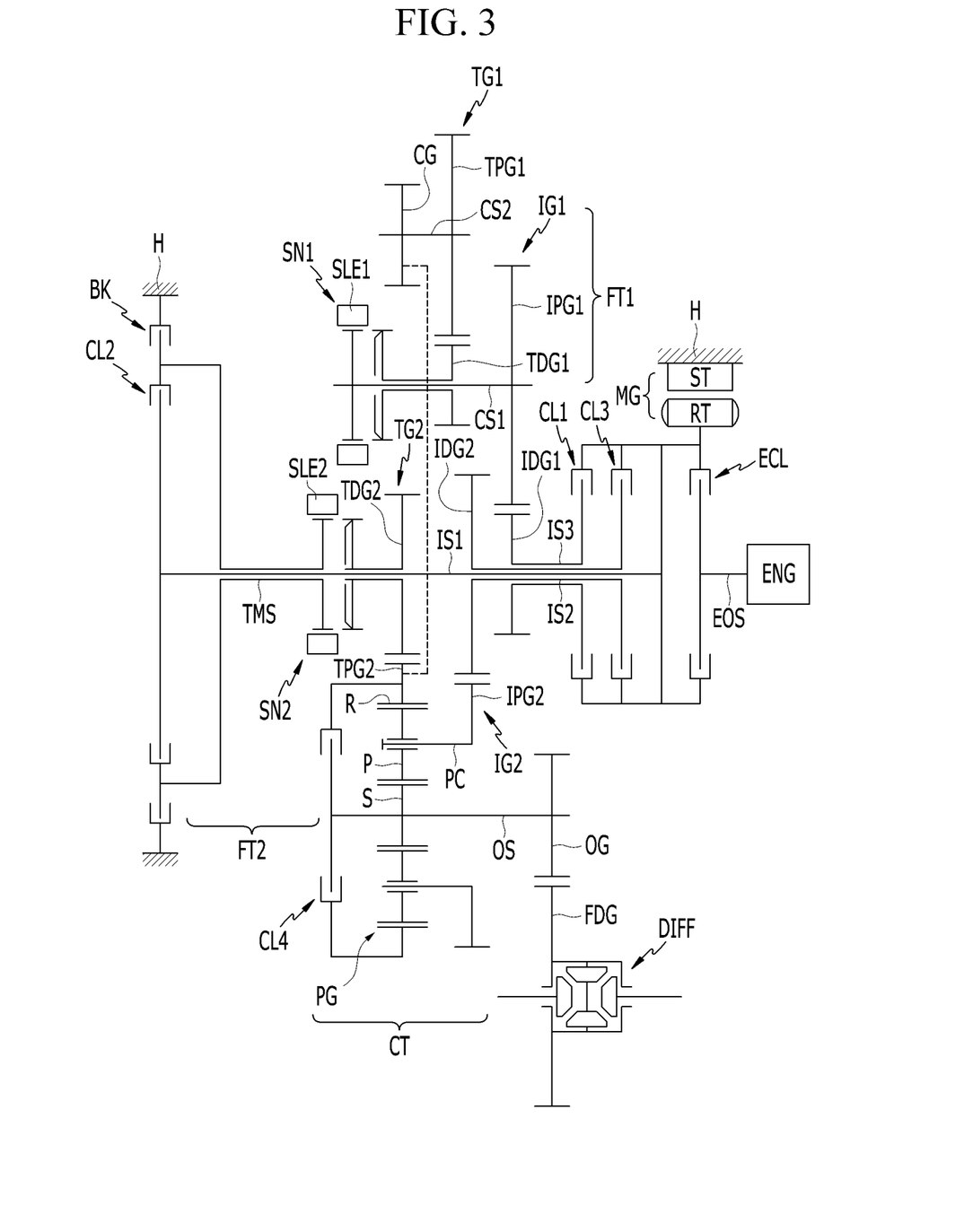
FIG. 3 is a schematic view of a power transmission apparatus for a vehicle according to a second exemplary form of the present disclosure.

FIG. 3 is a schematic view of a power transmission apparatus for a vehicle according to a second exemplary form of the present disclosure.

Referring to FIG. 3, in comparison with the first exemplary form, the second exemplary form further includes a motor/generator MG as an auxiliary power source such that a vehicle applied with the power transmission apparatus may be enabled with driving in a parallel hybrid mode and in an electric vehicle mode.

The motor/generator MG may act as a motor and as a generator, and includes a stator ST, which is fixed to the transmission housing H, and a rotor RT rotatably supported within the stator ST.

The motor/generator MG is disposed to be rear of the engine ENG. The rotor RT is selectively connected with the output shaft EOS of the engine ENG interposing an engine clutch ECL, fixedly connected with the first input shaft IS1, and selectively connected with the second and third input shafts IS2 and IS3 interposing the first and third clutches CL1 and CL3.

When the engine clutch ECL is operated, a driving torque of the engine ENG is input to the power transmission apparatus. In this state, a torque of the motor/generator MG may also be applied, thereby enabling a driving mode of a parallel hybrid driving mode, where both of an engine torque and a motor torque are used for driving a vehicle.

When the engine clutch ECL is released, the torque of the motor/generator MG may act as a sole power source, and a vehicle may be driven in an electric vehicle mode (EV).

Figure 4:
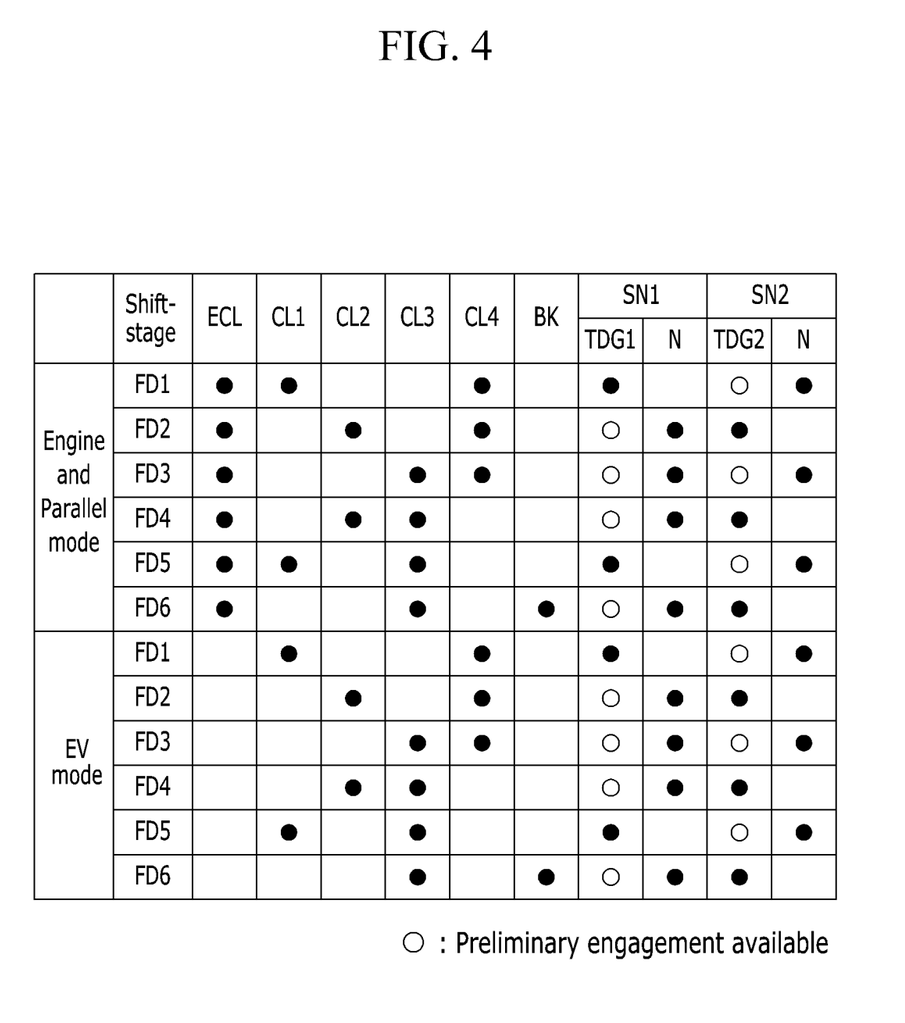
FIG. 4 is a shifting operational chart for a power transmission apparatus for a vehicle according to a second exemplary form of the present disclosure.

FIG. 4 is a shifting operational chart for a power transmission apparatus for a vehicle according to the second exemplary form of the present disclosure, and the power transmission apparatus for a vehicle according to the second exemplary form performs shifting operation as follows.

Referring to FIG. 4, when the engine clutch ECL is operated, six forward speeds are realized by the same operation of the clutches and the brake, since the torque of the motor/generator MG is merely an assistant torque to driving a vehicle and does not affect shifting operation of a power transmission apparatus.

In the electric vehicle mode EV, the torque of the motor/generator MG is used for driving a vehicle and does not affect shifting operation of a power transmission apparatus. Therefore, six forward speeds are realized by the same operation of the clutches and the brake.

Although the transmission according to the first form may not implement a reverse, in the case where the motor/generator MG is applied as in the second form, the motor/generator MG may be controlled to rotate in the reverse direction at the six forward speeds so as to realize reverse speeds.

Figure 5:
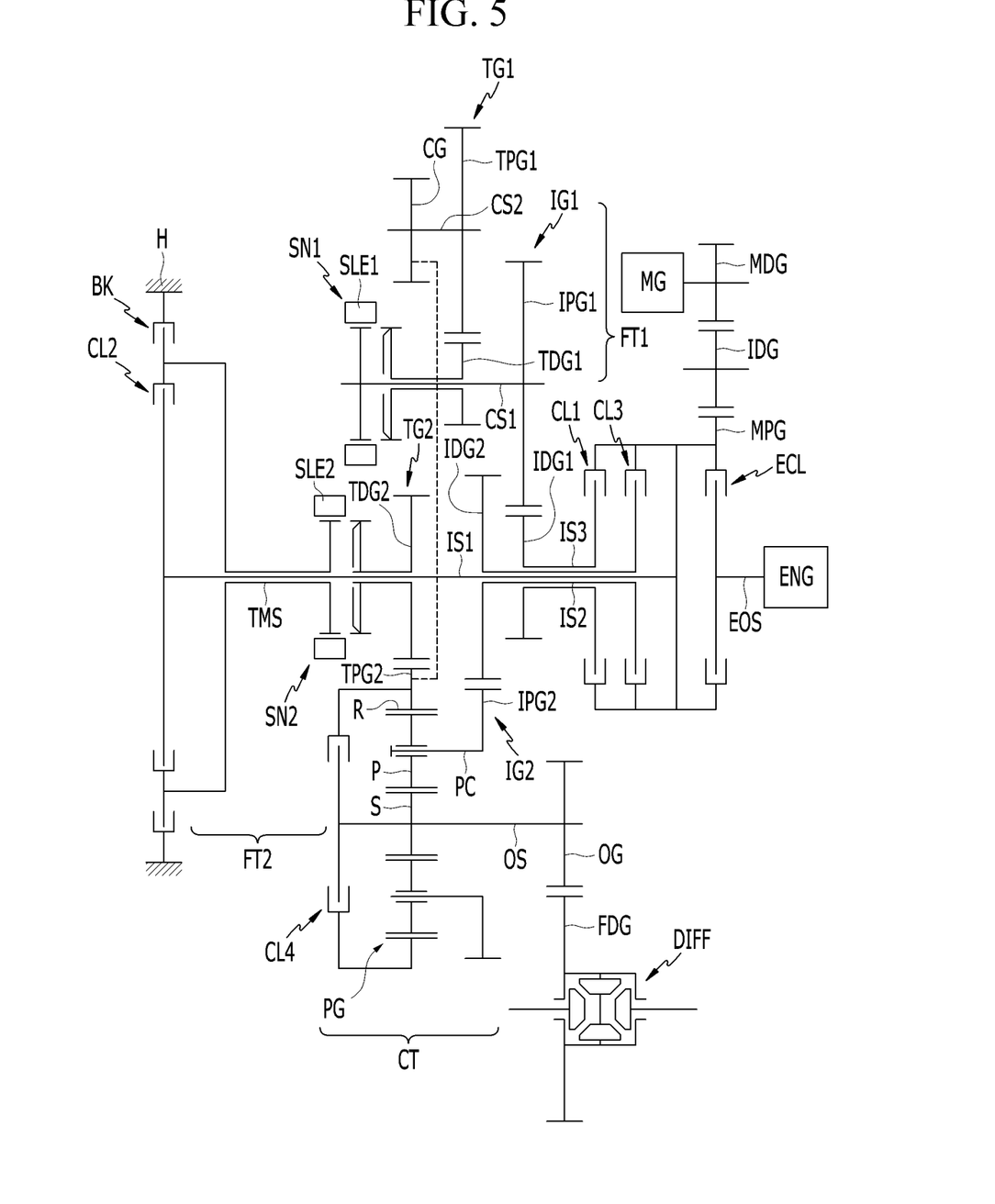
FIG. 5 is a schematic view of a power transmission apparatus for a vehicle according to a third exemplary form of the present disclosure.

FIG. 5 is a schematic view of a power transmission apparatus for a vehicle according to a third exemplary form of the present disclosure.

Referring to FIG. 5, the third exemplary form differs from the second exemplary form in that, while employing the motor/generator MG as an auxiliary power source, the motor/generator MG is disposed in parallel with the first, second, and third input shafts IS1, IS2, and IS3, differently from the second exemplary form where the motor/generator MG coaxially disposed with the first, second, and third input shafts IS1, IS2, and IS3.

In order to apply the torque from motor/generator MG, the power transmission apparatus further includes a motor drive gear MDG, a motor driven gear MPG, and an idle gear IDG disposed between the motor drive gear MDG and the motor driven gear MPG. The motor driven gear MPG is selectively connected with the engine output shaft EOS interposing the engine clutch ECL.

The motor driven gear MPG is fixedly connected with the first input shaft IS1, and selectively connected with the second and third input shafts IS2 and IS3 interposing the third and first clutches CL3 and CL1.

It will be obviously understood from the configuration that, a vehicle may be driven alternatively in a parallel hybrid driving mode or an electric vehicle mode, depending on the operation of the engine clutch ECL.

It will be obviously understood that a power transmission apparatus according to the third exemplary form realizes the same shift-stages by the same operation of clutches and the brake as in the second exemplary form.

Figure 6:
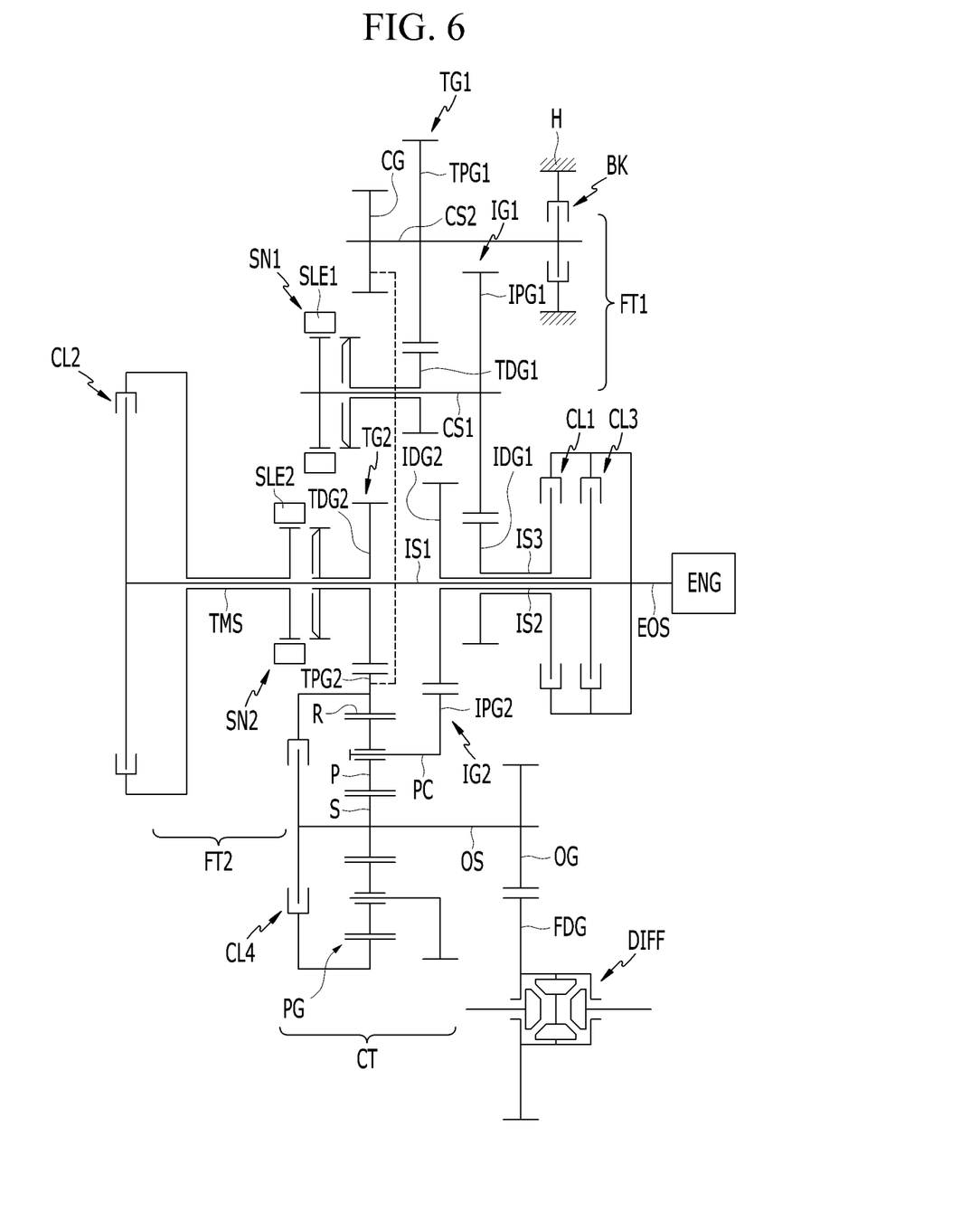
FIG. 6 is a schematic view of a power transmission apparatus for a vehicle according to a fourth exemplary form of the present disclosure.

FIG. 6 is a schematic view of a power transmission apparatus for a vehicle according to a fourth exemplary form of the present disclosure.

Referring to FIG. 6, the fourth exemplary form differs from the first exemplary form only in the location of the brake BK.

While the brake BK is disposed between the torque mediating shaft TMS and the transmission housing H in the first exemplary form, the brake BK is disposed between the second intermediate shaft CS2 and the transmission housing H.

A power transmission apparatus according to the fourth exemplary form realizes the same shift-stages by the same operation of clutches and the brake as in the first exemplary form, which is described in detail with reference to FIG. 7.

Figure 7:
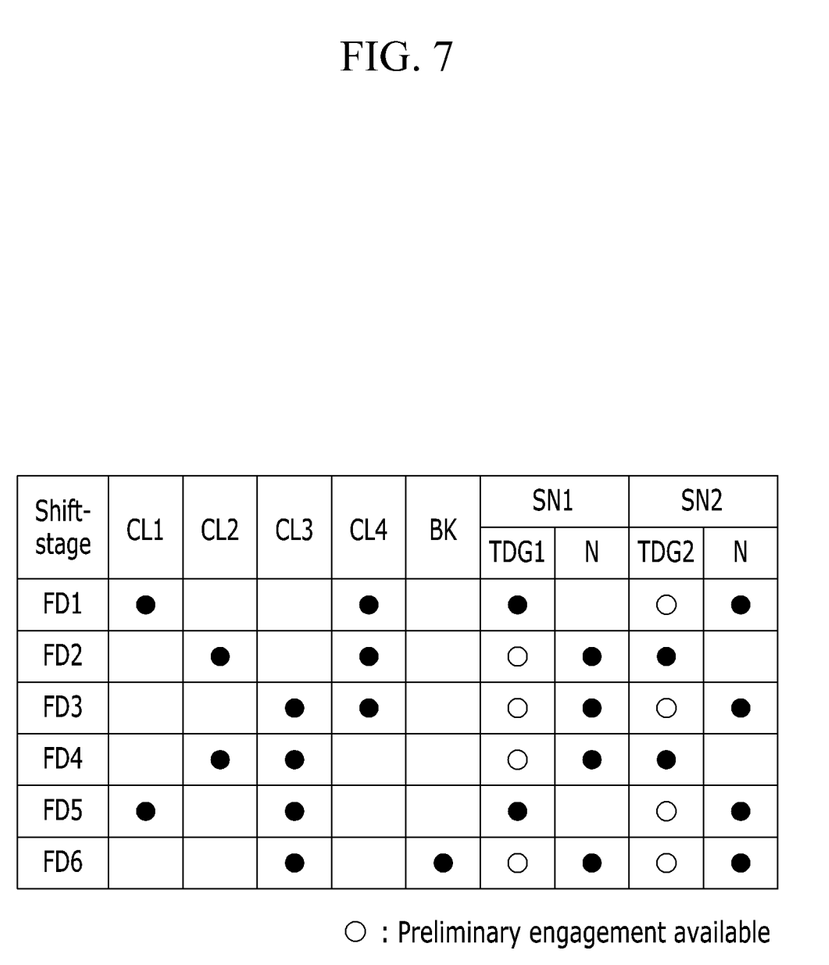
FIG. 7 is a shifting operational chart for a power transmission apparatus for a vehicle according to a fourth exemplary form of the present disclosure.

FIG. 7 is a shifting operational chart for a power transmission apparatus for a vehicle according to a fourth exemplary form of the present disclosure, and the power transmission apparatus for a vehicle according to the fourth exemplary form performs shifting operation as follows.

FIG. 7 shows the same operational chart as the operational chart for the first exemplary form (See, FIG. 2) except for "the forward sixth speed", which means that the power transmission apparatus according to the fourth exemplary form realizes the same shift-stages by operating the same engagement elements as in the first exemplary form except for "the forward sixth speed".

In the forward sixth speed FD6, as shown in FIG. 7, third clutch CL3 and the brake BK are operated.

According to the fourth form, the brake BK is operated to stop the second intermediate shaft CS2. Therefore, since the ring gear R is fixedly connected with the second intermediate shaft CS2 through the second shifting driven gear TPG2 and the intermediate gear CG the ring gear R is also stopped and acts as a fixed element.

While the ring gear R acts as a fixed element, the torque of the engine ENG is input to the planet carrier PC of the planetary gear set PG by the operation of the third clutch CL3.

Then, in comparison to the rotation speed input to the planet carrier PC, the ring gear R is stationary and thus the planetary gear set PG outputs a further increased speed than in the forward fifth speed, thereby realizing the forward sixth speed FD6 and outputting a shifted torque to the differential DIFF through the sun gear S and the output shaft OS.

As described above, a power transmission apparatus for a vehicle according to the first exemplary form enables shift-stages of six forward speeds by applying one planetary gear sets and two synchronizers to a dual clutch transmission, and accordingly multi-stages may be enabled with simpler structure and reduced weight, thereby improving installability and fuel consumption.

A power transmission apparatus for a vehicle according to the second and third exemplary forms further employs one motor/generator to the first exemplary form, and enables driving in an engine driving mode, a parallel hybrid mode, and an electric vehicle mode, thereby further improving fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

BK: brake
CL1,CL2,CL3,CL4: first, second, third, fourth clutches
CS1, CS2: first, second intermediate shafts
CT: compound shifting section
FT1, FT2: first, second preliminary shifting sections
EOS: engine output shaft (crankshaft)
IG1,IG2: first, second input gear sets
IDG1,IDG2: first, second input drive gears
IPG1,IPG2: first, second input driven gears
IS1,IS2,IS3, first, second, third input shafts
OG: output gear
OS: output shaft
TG1,TG2: first, second shifting gear sets
TDG1,TDG2: first, second shifting drive gears
TPG1,TPG2: first, second shifting driven gears
PG: planetary gear set
SN1,SN2: first, second synchronizers
TMS: torque mediating shaft

What is claimed is:

1. A power transmission apparatus for a vehicle, the power transmission apparatus comprising:
   a first input shaft connected with an output shaft of an engine;
   a second input shaft formed as a hollow shaft, coaxially and exteriorly disposed with the first input shaft without rotational interference, and selectively connected with the output shaft of the engine;
   a third input shaft formed as a hollow shaft, coaxially and exteriorly disposed with the second input shaft without rotational interference, and selectively connected with the output shaft of the engine;
   a torque mediating shaft formed as a hollow shaft and coaxially and exteriorly disposed with the first input shaft without rotational interference and selectively connected with the first input shaft or a transmission housing;
   first and second intermediate shafts and an output shaft respectively disposed in parallel with the first input shaft;
   a first preliminary shifting section receiving a torque through a first input gear set externally gear-meshed with the third input shaft, selectively shifting the received torque by a gear ratio of a first shifting gear set, and outputting the shifted torque;
   a second preliminary shifting section including a second shifting gear set which outputs a torque from the first input shaft and stops; and
   a compound shifting section including a planetary gear set having three rotation elements including a sun gear fixedly connected with the output shaft, forming an output torque based on a torque received from the second input shaft through a second input gear set and torques received from the first and second preliminary shifting sections, and outputting the output torque through the output shaft.

2. The power transmission apparatus of claim 1, wherein:
   the first input gear set comprises a first input drive gear and a first input driven gear, the first input drive gear being fixedly connected with the third input shaft, the first input driven gear being fixedly connected the first intermediate shaft and externally gear-meshed with the first input drive gear; and
   the first shifting gear set comprises a first shifting drive gear and a first shifting driven gear, the first shifting drive gear disposed coaxial with and exterior to the first intermediate shaft without rotational interference, the first shifting driven gear fixedly connected to the second intermediate shaft and externally gear-meshed with the first shifting drive gear.

3. The power transmission apparatus of claim 2, wherein the first shifting drive gear is selectively connected with the first intermediate shaft by a first synchronizer.

4. The power transmission apparatus of claim 2, wherein a gear ratio of the first shifting gear set provides a forward first speed and a forward fifth speed.

5. The power transmission apparatus of claim 1, wherein the second preliminary shifting section comprises a second shifting drive gear coaxially and exteriorly disposed with the first input shaft.

6. The power transmission apparatus of claim 5, wherein the second shifting drive gear is selectively connected with the torque mediating shaft by a second synchronizer.

7. The power transmission apparatus of claim 1, wherein:
   the planetary gear set of the compound shifting section comprises a ring gear, a planet carrier, and the sun gear;

the ring gear receives torques from the first and second preliminary shifting sections through the second shifting gear set;

the planet carrier receives a torque from the output shaft of the engine through the second input gear set; and the sun gear is selectively connected with the ring gear and fixedly connected with the output shaft so as to act as an output element.

8. The power transmission apparatus of claim 7, wherein:

the second input gear set comprises a second input drive gear and a second input driven gear, the second input drive gear fixedly connected with the second input shaft, the second input driven gear fixedly connected with the planet carrier and externally gear-meshed with the second input drive gear; and the second shifting gear set comprises a second shifting drive gear, an intermediate gear, and a second shifting driven gear, the intermediate gear being fixedly mounted on the second intermediate shaft, the second shifting driven gear being fixedly formed on the ring gear and externally gear-meshed with the second shifting drive gear and the intermediate gear, respectively.

9. The power transmission apparatus of claim 8, wherein a gear ratio of the second shifting drive gear and the second shifting driven gear provides a forward second speed and a forward fourth speed.

10. The power transmission apparatus of claim 1, further comprising:

four clutches each selectively connecting a corresponding pair of rotating members; and a brake selectively connecting a rotating member to the transmission housing.

11. The power transmission apparatus of claim 10, wherein:

the four clutches comprise:

a first clutch arranged between the output shaft of the engine and the third input shaft;

a second clutch arranged between the first input shaft and the torque mediating shaft;

a third clutch arranged between the output shaft of the engine and the second input shaft; and a fourth clutch arranged between a ring gear and the sun gear of the planetary gear set, and wherein the brake is disposed between the torque mediating shaft and the transmission housing.

12. The power transmission apparatus of claim 10, wherein:

the four clutches comprise:

a first clutch arranged between the output shaft of the engine and the third input shaft;

a second clutch arranged between the first input shaft and the torque mediating shaft;

a third clutch arranged between the output shaft of the engine and the second input shaft;

a fourth clutch arranged between a ring gear and the sun gear of the planetary gear set, and wherein the brake is disposed between the second intermediate shaft and the transmission housing.

13. The power transmission apparatus of claim 1, further comprising: a motor/generator coaxially coupled with the first input shaft, selectively connected with the output shaft of the engine through an engine clutch, and selectively connected with the second and third input shafts through respective clutches.

14. The power transmission apparatus of claim 1, further comprising:

a motor/generator disposed in parallel with the first input shaft;

a motor drive gear receiving a torque from the motor/generator;

a motor driven gear coaxially formed with the first input shaft; and an idle gear externally gear-meshed with the motor drive gear and the motor driven gear, respectively, and wherein the torque from the motor/generator is delivered to the first input shaft through the motor drive gear, the idle gear, and the motor driven gear.

15. The power transmission apparatus of claim 14, wherein the motor driven gear is fixedly coupled with the first input shaft, selectively connected with the output shaft of the engine through an engine clutch, and selectively connected with the second and third input shafts through respective clutches.

* * * * *